(12) United States Patent
Sekiya (10) Patent No.: US 11,534,862 B2
(45) Date of Patent: Dec. 27, 2022

(54) LASER PROCESSING APPARATUS

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 344 days.

(21) Appl. No.: 16/830,407

(22) Filed: Mar. 26, 2020

(65) Prior Publication Data

US 2020/0324369 A1 Oct. 15, 2020

(30) Foreign Application Priority Data

Apr. 9, 2019 (JP) .............................. JP2019-074276
Jan. 17, 2020 (JP) .............................. JP2020-006409

(51) Int. Cl.
*B23K 26/06* (2014.01)
*B23K 26/08* (2014.01)
*B23K 26/082* (2014.01)

(52) U.S. Cl.
CPC ...... *B23K 26/0665* (2013.01); *B23K 26/0821* (2015.10); *B23K 26/0823* (2013.01)

(58) Field of Classification Search
CPC .............. B23K 26/0665; B23K 26/064; B23K 26/009; B23K 26/034; B23K 26/402; B23K 26/53; B23K 26/0622; B23K 26/364; B23K 26/032; B23K 26/046; B23K 26/0648; B23K 26/067; B23K 26/04; B23K 26/0006; B23K 26/50; B23K 37/04; B23K 37/0408; B23K 26/122; B23K 26/18; B23K 26/40; B23K 26/702; B23K 26/359; B23K 26/0736; B23K 26/0626; B23K 26/043; B23K 26/389; B23K 26/044; B23K 26/16; B23K 26/382; B23K 26/38; B23K 26/70; B23K 26/36; B23K 26/0673; B23K 26/0093; B23K 26/0676; B23K 26/351; B23K 26/0652; B23K 26/035; B23K 26/0643; B23K 26/57; B23K 26/042; B23K 26/0604; B23K 26/0613; B23K 26/02; B23K 26/0624; B23K 26/355; B23K 26/06; B23K 26/03; B23K 26/073;
(Continued)

(56) References Cited

U.S. PATENT DOCUMENTS

2017/0087671 A1* 3/2017 Tanaka ................. B32B 15/011

FOREIGN PATENT DOCUMENTS

JP 2013179237 A 9/2013
JP 2015085347 A * 5/2015 ......... B23K 26/0876
JP 6574125 B2 * 9/2019

* cited by examiner

*Primary Examiner* — Ibrahime A Abraham
*Assistant Examiner* — Joe E Mills, Jr.
(74) *Attorney, Agent, or Firm* — Greer, Burns & Crain, Ltd.

(57) ABSTRACT

A laser processing apparatus includes two chuck tables for holding workpieces on their holding surfaces, an X-axis feed unit for moving the chuck tables which are being arrayed in an X-axis direction, a laser beam applying unit for applying a laser beam to the workpiece on one at a time of the chuck tables to process the workpiece, and a pair of delivery areas arrayed in the X-axis direction on both sides of the laser beam applying unit, for delivering workpieces to and from the chuck tables. The laser beam applying unit includes a laser oscillator, a beam condenser, and a laser beam scanning unit for displacing a position where the laser beam is applied to the holding surface of the one of the chuck tables.

9 Claims, 5 Drawing Sheets (58) Field of Classification Search
CPC ............ B23K 26/066; H01L 21/67092; H01L 21/67259; H01L 22/00; H01L 23/544; H01L 21/67253; H01L 21/304; H01L 21/78; H01L 21/67242; H01L 21/67766; H01L 21/67294; H01L 21/3043; H01L 21/67115; H01L 21/268; H01L 33/0093; H01L 21/6773; H01L 21/6719; H01L 21/67772; H01L 21/67346; H01L 21/67778; H01L 21/82; H01L 21/2686; H01L 21/67219; H01L 21/30; H01L 24/743; H01L 22/12; H01L 21/67132; B32B 15/011; B24B 7/228; B28D 5/04; B25B 11/005; B41J 2/465; B41J 2/1634; G01J 1/4257
See application file for complete search history.

LASER PROCESSING APPARATUS

BACKGROUND OF THE INVENTION

Field of the Invention

The present invention relates to a laser processing apparatus.

Description of the Related Art

Cutting apparatuses have heretofore been used for cutting and processing various plate-shaped workpieces such as semiconductor wafers, sapphire substrates, silicon carbide (SiC) substrates, glass substrates, resin-packaged substrates, etc. with a cutting blade. Laser processing has also been used to apply a laser beam to a substrate to remove a substrate material or form modified layers in the substrate along projected dicing lines (see JP2013-179237A). A cutting apparatus cuts a workpiece along a street thereon by process-feeding a chuck table that is holding the workpiece in an X-axis direction with respect to a cutting blade fixed to a spindle. The cutting apparatus is able to process the workpiece along all streets thereon by index-feeding the spindle in a Y-axis direction perpendicular to the X-axis direction.

SUMMARY OF THE INVENTION

A laser processing apparatus as disclosed in JP2013-179237A is significantly different from the cutting apparatus described above in that a laser beam applying unit is capable of scanning a workpiece with a laser beam. Since the laser processing apparatus can move a focused laser beam spot, i.e., a processing spot, without moving a chuck table, the laser processing apparatus processes the workpiece at high speed by a high-speed scanning process that cannot be achieved by the speed at which the chuck table moves.

However, since the laser processing apparatus as disclosed in JP2013-179237A is designed on the basis of the idea of the cutting apparatus described above, the laser processing apparatus has failed to fully realize an efficient apparatus makeup that would exploit the characteristics of a laser beam applying unit.

It is therefore an object of the present invention to provide a laser processing apparatus that is capable of performing an efficient laser processing process exploiting the characteristics of a laser beam applying unit.

In accordance with an aspect of the present invention, there is provided a laser processing apparatus including a first chuck table for holding a workpiece on a holding surface thereof, a second chuck table for holding a workpiece on a holding surface thereof, an X-axis feed unit for moving the first chuck table and the second chuck table which are being arrayed in an X-axis direction, a laser beam applying unit for applying a laser beam to the workpiece on one at a time of the first chuck table and the second chuck table to process the workpiece, and a pair of delivery areas arrayed in the X-axis direction on both sides of the laser beam applying unit, for delivering workpieces to and from the first chuck table and the second chuck table. The laser beam applying unit includes a laser oscillator for emitting the laser beam, a beam condenser for condensing the laser beam emitted from the laser oscillator, and a laser beam scanning unit disposed between the laser oscillator and the beam condenser, for displacing a position where the laser beam is applied to the holding surface of the one of the first chuck table and the second chuck table.

Preferably, the laser beam scanning unit includes either one of a galvanometer scanner, a resonant scanner, an acousto-optic deflector, and a polygon mirror. Preferably, the first chuck table and the second chuck table each include a rotary unit for rotating the holding surface thereof about an axis perpendicular to the holding surface.

Preferably, the laser processing apparatus further includes a pair of loading and unloading units disposed in the delivery areas, for delivering workpieces to and from the first chuck table and the second chuck table. The laser processing apparatus according to the present invention is able to carry out an efficient laser processing process using a feature of the laser beam applying unit.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENTS

Preferred embodiments of the present invention will hereinafter be described in detail below with reference to the drawings. The present invention is not limited to the details of the embodiments described below. The components described below cover those which could easily be anticipated by those skilled in the art and those which are essentially identical thereto. Furthermore, the arrangements described below can be used in appropriate combinations. Various omissions, replacements, or changes of the arrangements may be made without departing from the scope of the present invention.

First Embodiment

Figure 1:
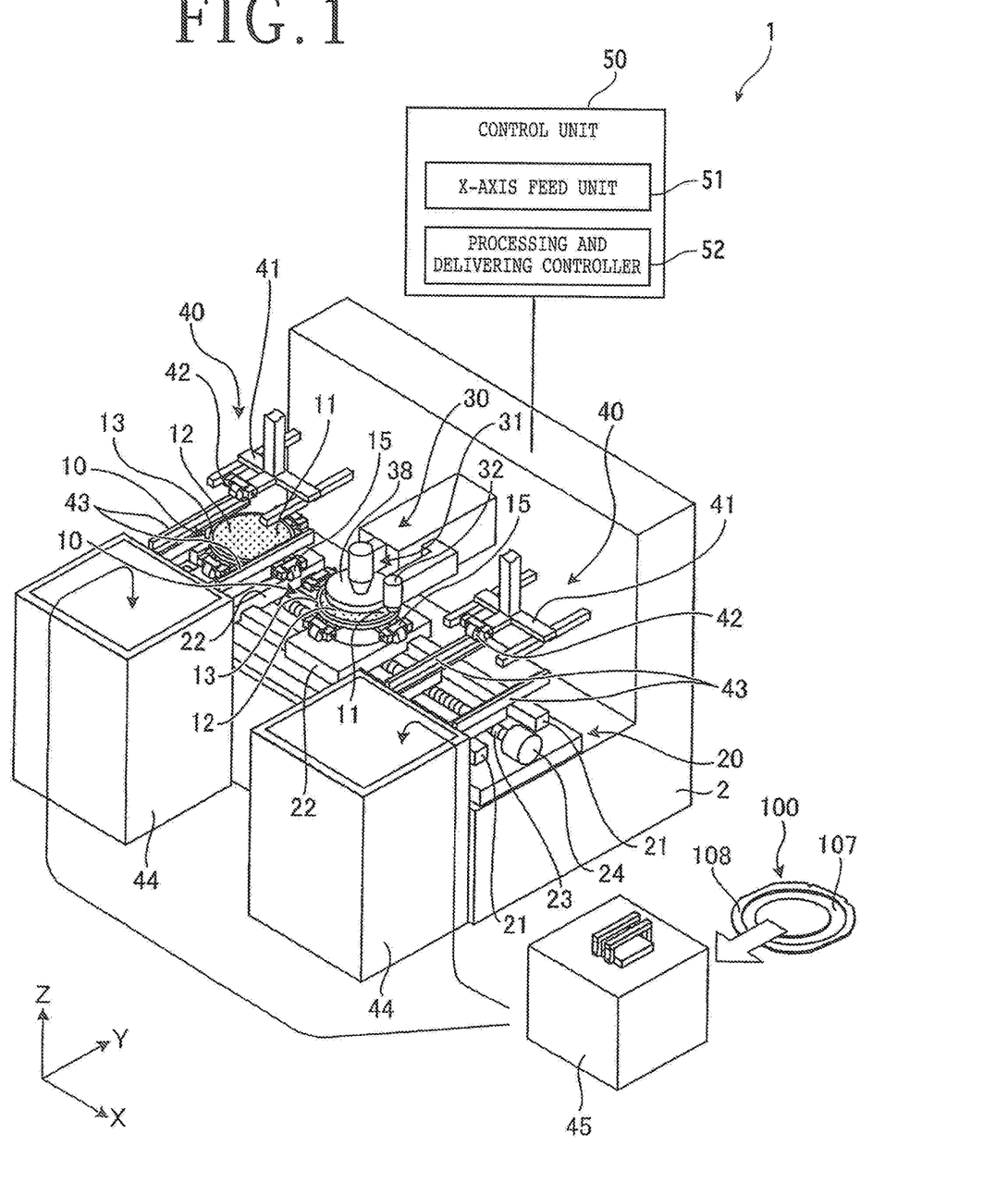
FIG. 1 is a perspective view illustrating an example of a configuration of a laser processing apparatus according to a first embodiment of the present invention.

A laser processing apparatus according to a first embodiment of the present invention will be described below. FIG. 1 illustrates in perspective an example of a configuration of the laser processing apparatus according to the first embodiment. The laser processing apparatus, denoted by 1 in FIG. 1, according to the first embodiment is an apparatus for processing a workpiece 100 by applying a laser beam thereto. It is assumed that an X-axis direction, a Y-axis direction, and a Z-axis direction to be described below are perpendicular to each other. In the description given below, the X-axis direction represents a horizontal direction whereas the Y-axis direction represents a different horizontal direction, i.e., another horizontal direction. However, the Y-axis direction may represent a horizontal direction whereas the X-axis direction may represent a different horizontal direction, i.e., another horizontal direction. In the description given below, an XY plane represents a horizontal plane, and the Z-axis direction represents a vertical direction. However, an XY plane may deviate from a horizontal plane, and a Z-axis direction may deviate from a vertical direction.

The workpiece 100 to be processed by the laser beam on the laser processing apparatus 1 according to the first embodiment includes a semiconductor wafer, an optical device wafer, or the like, and may include any of various plate-shaped substrates such as silicon substrates, sapphire substrates, gallium substrates, SiC substrates, glass substrates, and resin-packaged substrates, for example. Although the workpiece 100 according to the first embodiment includes a semiconductor wafer or an optical device wafer that has a constant thickness, the workpiece according to the present invention may include a so-called TAIKO wafer having a thicker portion in an outer circumferential region thereof.

According to the first embodiment, the workpiece 100 includes a plurality of devices, not illustrated, disposed in a grid of respective areas on a face side thereof that are demarcated by a plurality of projected dicing lines, not illustrated. The workpiece 100 is divided into a plurality of device chips including the respective devices by being processed along the projected dicing lines by a laser beam on the laser processing apparatus 1.

According to the first embodiment, a dicing tape 107 that includes an adhesive tape having a diameter larger than the substrate is stuck to a reverse side of the workpiece 100, and an annular frame 108 is stuck to an outer circumferential region of the dicing tape 107. In other words, the workpiece 100 is supported in an opening in the annular frame 108 by the dicing tape 107. According to the present invention, the workpiece 100 is not limited to such an assembly, but may be free of the dicing tape 107 and the annular frame 108.

Furthermore, the workpiece 100 is not limited to the form described above that has the projected dicing lines. According to the present invention, the workpiece may instead be of a structure including an epitaxy substrate, not illustrated, an optical device layer, not illustrated, layered on a face side of the epitaxy substrate with a buffer layer, not illustrated, interposed therebetween, and a relocation substrate, not illustrated, joined to a face side of the optical device layer by a joining layer, not illustrated. The buffer layer is processed by a laser beam on the laser processing apparatus 1, making the optical device layer peelable.

As illustrated in FIG. 1, the laser processing apparatus 1 according to the first embodiment includes two, i.e., a pair of, chuck tables 10, an X-axis feed unit 20, a laser processing unit 30, a pair of delivery areas 40, and a control unit 50.

The two chuck tables 10 are structurally identical to each other except that one of them is positioned on a +X direction side with respect to the other, i.e., the other of them is positioned on a −X direction side with respect to one of them. According to the first embodiment, one of the two chuck tables 10 corresponds to a first chuck table according to the present invention, whereas the other corresponds to a second chuck table according to the present invention. However, the other of the two chuck tables 10 may correspond to a first chuck table according to the present invention, whereas the other may correspond to a second chuck table according to the present invention.

As illustrated in FIG. 1, each of the chuck tables 10, hereinafter referred to as the chuck table 10, is of a disk shape including a holder 12 having a holding surface 11 for holding the workpiece 100 thereon and made of a porous ceramics or the like, and a ring-shaped frame 13 surrounding the holder 12 and made of conductive metal. The chuck table 10 is movable in the X-axis direction by the X-axis feed unit 20.

The chuck table 10 is connected to a vacuum suction source, not illustrated, and attracts and holds the workpiece 100 under suction thereon by being evacuated by the vacuum suction source. The chuck table 10 is also connected to a gas supply source, not illustrated, and releases the workpiece 100 by being supplied with a gas under pressure from the gas supply source.

The chuck table 10 includes four clamps 15 disposed around the holding surface 11 for holding and fixing the frame 108 that supports the workpiece 100 through the dicing tape 107.

The X-axis feed unit 20 is disposed on an upper surface of a horizontal portion of an L-shaped base 2 and extends along the X-axis direction. The X-axis feed unit 20 moves the two chuck tables 10 simultaneously in the X-axis direction while they are being arrayed in the X-axis direction. As illustrated in FIG. 1, the X-axis feed unit 20 includes a pair of X-axis guide rails 21 extending generally parallel to each other in the X-axis direction, two, i.e., a pair of, X-axis moving tables 22 mounted on the X-axis guide rails 21 for sliding movement in the X-axis direction, an X-axis ball screw 23 threaded through lower surfaces of the two X-axis moving tables 22 and shared by the two X-axis moving tables 22, the X-axis ball screw 23 extending parallel to the X-axis guide rails 21, and an X-axis stepping motor 24 coupled to an end of the X-axis ball screw 23.

The two X-axis moving tables 22 are structurally identical to each other except that one of them is positioned on a +X direction side with respect to the other, i.e., the other of them is positioned on a −X direction side with respect to one of them. According to the first embodiment, one of the chuck tables 10 is rotatably supported on one of the X-axis moving tables 22 for rotation about a Z-axis, whereas the other chuck table 10 is rotatably supported on the other X-axis moving table 22 for rotation about the Z-axis.

When the X-axis stepping motor 24 rotates the X-axis ball screw 23 about its own axis, the two X-axis moving tables 22, as they are arrayed in the X-axis direction, are simultaneously moved in the X-axis direction along the X-axis guide rails 21. Therefore, one of the chuck tables 10 rotatably supported on one of the X-axis moving tables 22 and the other chuck table 10 rotatably supported on the other X-axis moving table 22, as they are arrayed in the X-axis direction, are simultaneously moved in the X-axis direction along the X-axis guide rails 21. The X-axis feed unit 20 includes an X-axis measuring unit, not illustrated, for measuring respective positions in the X-axis direction of the two X-axis moving tables 22. The X-axis measuring unit can measure respective positions in the X-axis direction of the two chuck tables 10 on the basis of the measured positions in the X-axis direction of the two X-axis moving tables 22.

As illustrated in FIG. 1, the laser processing unit 30 projects from an upstanding portion erected from the horizontal portion of the L-shaped base 2, in a −Y direction in an overhanging relation to the pair of X-axis guide rails 21 of the X-axis feed unit 20. The laser processing unit 30 includes a laser beam applying unit 31 and an image capturing unit 32 spaced from the laser beam applying unit 31 in the X-axis direction and oriented in a −Z direction.

Figure 2:
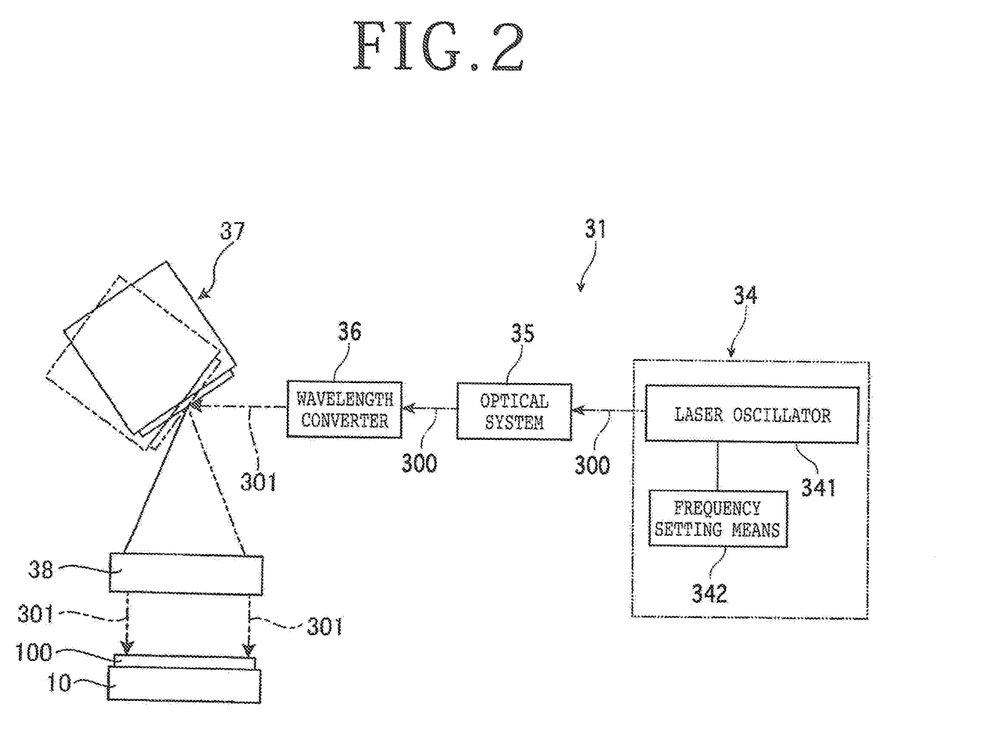
FIG. 2 is a schematic diagram illustrating an example of a configuration of a laser beam applying unit according to the first embodiment.

FIG. 2 schematically illustrates an example of a configuration of the laser beam applying unit 31 according to the first embodiment. The laser beam applying unit 31 processes the workpiece 100 held on the chuck table 10 by applying a laser beam 301 to the workpiece 100. As illustrated in FIG. 2, the laser beam applying unit 31 includes a laser beam generating unit 34, an optical system 35, a wavelength converter 36, a laser beam scanning unit 37, and a beam condenser 38.

The laser beam generating unit 34 includes a laser oscillator 341 and repetitive frequency setting means 342. The laser oscillator 341 is an instrument for oscillating an original laser having a predetermined wavelength. According to the first embodiment, the laser oscillator 341 preferably oscillates an original laser having a wavelength of approximately 1 μm by exciting a crystal of yttrium aluminum garnet (YAG) or the like doped with neodymium (Nd) ions or the like with a laser diode (LD).

The repetitive frequency setting means 342 is means for setting a repetitive frequency for a laser beam emitted from the laser oscillator 341. According to the first embodiment, the repetitive frequency setting means 342 preferably sets a repetitive frequency twice the frequency of an original laser beam emitted from the laser oscillator 341, so that the laser beam generating unit 34 generates a laser beam 300 having a wavelength of approximately 514 nm that is twice the wavelength of approximately 1 μm of the original laser beam emitted from the laser oscillator 341, on the basis of the original laser beam having the wavelength of approximately 1 μm.

According to the first embodiment, the laser beam generating unit 34 is controlled by the control unit 50 to generate a laser beam 300 that is a pulsed laser beam having a repetitive frequency ranging from 50 to 200 kHz, an average output power ranging from 0.1 to 2.0 W, and a pulse duration of 20 ps or less.

The optical system 35 includes at least one of predetermined optical instruments including a beam diameter adjuster, an output adjuster, etc., and transmits the laser beam 300 generated by the laser beam generating unit 34. The wavelength converter 36 is an element for converting the wavelength of the laser beam 300 transmitted by the optical system 35. According to the first embodiment, the wavelength converter 36 converts the laser beam 300 having the wavelength of approximately 514 nm generated by the laser beam generating unit 34 into a laser beam 301 having a wavelength of approximately 257 nm, which is a second order harmonic of the laser beam 300 or a fourth order harmonic of the original laser beam having the wavelength of approximately 1 μm.

According to the first embodiment, since the wavelength converter 36 is disposed downstream of the optical system 35 with respect to a direction of travel of the laser beams 300 and 301 in the laser beam applying unit 31, the wavelength of the laser beam 300 that passes through the optical system 35 is longer than the wavelength of the laser beam 301 that is finally applied to the workpiece 100 by the laser beam applying unit 31, and therefore damage to the optical system 35 is reduced.

As illustrated in FIG. 2, the laser beam scanning unit 37 is disposed between the laser oscillator 341 and the beam condenser 38. More specifically, the laser beam scanning unit 37 is disposed downstream of the optical system 35 and the wavelength converter 36 that are disposed downstream of the laser beam generating unit 34 including the laser oscillator 341. The laser beam scanning unit 37 displaces a position on the XY plane where the laser beam 301 is applied over the holding surface 11 of the chuck table 10.

According to the first embodiment, the laser beam scanning unit 37 includes either one of a galvanometer scanner, a resonant scanner, an acousto-optic deflector, and a polygon mirror. The laser beam scanning unit 37 is controlled by the control unit 50 to swing the laser beam 301 in the X-axis direction and the Y-axis direction toward the beam condenser 38.

The beam condenser 38 is of a circular shape having a diameter equal to or larger than the diameter of the holding surface 11 of the chuck table 10 in the XY plane. The beam condenser 38 is disposed in covering relation to an area over the holding surface 11 of the chuck table 10 when the chuck table 10 is positioned below the laser beam applying unit 31. The beam condenser 38 condenses the laser beam 301 emitted from the laser oscillator 341 and scanned by the laser beam scanning unit 37.

The beam condenser 38 includes, for example, an fθ lens having the diameter referred to above or a large image-side telecentric objective lens having the diameter referred to above, and has an optical axis extending along the Z-axis direction. The beam condenser 38 applies the laser beam 301 guided by the laser beam scanning unit 37 toward the holding surface 11 of the chuck table 10 in a direction parallel to the Z-axis direction, or the optical axis thereof, i.e., in a direction perpendicular to the holding surface 11 of the chuck table 10, independently of the angle of incidence of the laser beam 301 from the laser beam scanning unit 37.

As illustrated in FIG. 1, the image capturing unit 32 is disposed at a position outside of the beam condenser 38 of the laser beam applying unit 31 in the XY plane, and is oriented in the −Z direction. Therefore, the image capturing unit 32 is capable of capturing an image of the X-axis moving table 22 supporting thereon the chuck table 10 that is positioned below the laser beam applying unit 31, without being obstructed by the beam condenser 38. The image capturing unit 32 captures an image of the workpiece 100 held on the holding surface 11 of the chuck table 10 that is positioned below the image capturing unit 32, as an image to be used for an alignment process for positioning the workpiece 100 held on the holding surface 11 of the chuck table 10 and the position where the laser beam 301 is applied by the laser beam applying unit 31 with respect to each other, and outputs the acquired image to the control unit 50. According to the first embodiment, before the workpiece 100 is processed by the laser beam applying unit 31, the chuck table 10 may be positioned below the image capturing unit 32, then the alignment process may be carried out, and thereafter the chuck table 10 may be moved to a position below the beam condenser 38. Then, the workpiece 100 may be processed by the laser beam applying unit 31.

As illustrated in FIG. 1, the delivery areas 40 are arrayed in the X-axis direction on both sides of the laser beam applying unit 31 of the laser processing unit 30. Specifically, the delivery areas 40 are disposed on both sides of an area where the laser beam applying unit 31 is disposed in the X-axis direction. More specifically, one of the delivery areas 40 is disposed on a +X direction side of the area where the laser beam applying unit 31 is disposed, whereas the other delivery area 40 is disposed on a −X direction side of the area where the laser beam applying unit 31 is disposed. The pair of delivery areas 40 are of the same structure except that one of them is disposed on the +X direction side with respect to the other and the other is disposed on the −X direction side with respect to the one of them.

As illustrated in FIG. 1, either one of the interval in the X-axis direction between one of the delivery areas 40 and the area where the laser beam applying unit 31 is disposed and the interval in the X-axis direction between the area where the laser beam applying unit 31 is disposed and the other delivery area 40 is equal to the interval in the X-axis direction between the two X-axis moving tables 22 of the X-axis feed unit 20, i.e., is equal to the interval in the X-axis direction between the two chuck tables 10. Therefore, in the laser processing apparatus 1 according to the first embodiment, when one of the chuck tables 10 is positioned in the area where the laser beam applying unit 31 is disposed, the other chuck table 10 is positioned in the other delivery area 40, and when the other chuck table 10 is positioned in the area where the laser beam applying unit 31 is disposed, the one of the chuck tables 10 is positioned in the one of the delivery areas 40.

As illustrated in FIG. 1, each of the delivery areas 40 includes a loading and unloading unit 41, a pair of Y-axis guide rails 43 extending generally parallel to each other in the Y-axis direction, a cassette elevator 44, and a cassette 45. The loading and unloading unit 41 loads the workpiece 100 onto the chuck table 10 positioned in the delivery area 40 and unloads the workpiece 100 from the chuck table 10 positioned in the delivery area 40. The loading and unloading unit 41 includes a gripper 42 for gripping the frame 108 that supports the workpiece 100 through the dicing tape 107. A drive mechanism, not illustrated, is controlled by the control unit 50 to move the loading and unloading unit 41 along the Y-axis direction.

As illustrated in FIG. 1, the Y-axis guide rails 43 are supported on an end in the +Y direction of the upper surface of the cassette elevator 44 and project in the +Y direction toward a region above the X-axis guide rails 21 of the X-axis feed unit 20. The Y-axis guide rails 43 are controlled by the control unit 50 to move apart from or toward each other along the X-axis direction, thereby changing the distance between them.

As illustrated in FIG. 1, the cassette elevator 44 is disposed adjacent to an end face in the −Y direction of the horizontal portion of the L-shaped base 2. The cassette elevator 44 provides a cassette placement area on its upper surface for placing the cassette 45, which houses workpieces 100 before and after they are processed by the laser beam, thereon. The cassette elevator 44 is controlled by the control unit 50 to move the cassette 45 vertically along the Z-axis direction.

The cassette 45 houses therein workpieces 100 before they are processed by the laser beam and workpieces 100 after they have been processed by the laser beam, separately from each other. The cassette 45 is placed on an upper surface of the cassette elevator 44. When the cassette elevator 44 is vertically moved, it can change workpieces 100 to be unloaded from the cassette 45 by the loading and unloading unit 41.

A process for unloading a workpiece 100 by the loading and unloading unit 41 will be described below. The loading and unloading unit 41 moves in the −Y direction and grips, with the gripper 42, a frame 108 supporting a workpiece 100 to be processed in the cassette 45 placed on the cassette elevator 44. Then, the loading and unloading unit 41 moves in the +Y direction while the gripper 42 is gripping the frame 108 supporting the workpiece 100, unloading the workpiece 100 to be processed from the cassette 45. When the workpiece 100 whose frame 108 is gripped by the gripper 42 is unloaded from the cassette 45, both ends of the frame 108 in the X-axis direction are guided by the Y-axis guide rails 43, unloading the workpiece 100 along the +Y direction. Thereafter, the loading and unloading unit 41 causes the gripper 42 to release the frame 108 supporting the workpiece 100. The frame 108 released from the gripper 42 is now supported on the Y-axis guide rails 43.

The Y-axis guide rails 43 are moved toward each other, reducing the interval therebetween, performing a centering process to position the frame 108 at a predetermined position in the X-axis direction. Thereafter, the loading and unloading unit 41 causes vacuum pads, not illustrated, disposed on a lower portion thereof to hold under suction the frame 108 positioned at the predetermined position, and moves the frame 108 upwardly, thereby lifting the workpiece 100 from the Y-axis guide rails 43. Then, the Y-axis guide rails 43 are moved away from each other, increasing the interval therebetween, and the loading and unloading unit 41 with the frame 108 held under suction thereby is lowered to move the workpiece 100 and the frame 108 between the Y-axis guide rails 43 and place them on the chuck table 10.

A process for loading a workpiece 100 by the loading and unloading unit 41 will be described below. After having moved in the +Y direction, the loading and unloading unit 41 moves downwardly between the Y-axis guide rails 43, causes the vacuum pads, not illustrated, on the lower portion thereof to hold under vacuum the frame 108 that supports the workpiece 100 that has been processed by the laser beam, and moves the frame 108 upwardly beyond the Y-axis guide rails 43. The Y-axis guide rails 43 are moved toward each other, reducing the interval therebetween, and the loading and unloading unit 41 with the frame 108 held under suction thereby is lowered to place the workpiece 100 and the frame 108 between the Y-axis guide rails 43. The frame 108 supporting the workpiece 100 that has been processed by the laser beam is now supported by the Y-axis guide rails 43.

After the loading and unloading unit 41 has further moved in the +Y direction, the gripper 42 thereof grips the frame 108 that supports the workpiece 100 that has been processed by the laser beam and supported by the Y-axis guide rails 43. Thereafter, the loading and unloading unit 41 while the gripper 42 is gripping the frame 108 that supports the workpiece 100 moves in the −Y direction, loading the processed workpiece 100 into the cassette 45. When the workpiece 100 with the frame 108 gripped by the gripper 42 is loaded into the cassette 45, both ends of the frame 108 along the X-axis direction are supported and guided by the Y-axis guide rails 43 as the workpiece 100 is loaded along the −Y direction. Then, the loading and unloading unit 41 causes the gripper 42 to release the frame 108 supporting the processed workpiece 100, which is now stored in the cassette 45.

According to the first embodiment, the loading and unloading unit 41 automatically unloads and loads the workpiece 100. However, the present invention is not limited to such an automatic unloading and loading mechanism, but an operator of the laser processing apparatus 1 may manually unload and load the workpiece 100.

The control unit 50 controls the units of the laser processing apparatus 1, i.e., controls the X-axis feed unit 20 to move the chuck table 10 in the X-axis direction, controls the laser processing unit 30 to process, with the laser beam, the workpiece 100 held on the holding surface 11 of the chuck table 10, controls the loading and unloading unit 41 to unload a workpiece 100 to be processed from the cassette 45 onto the holding surface 11 of the chuck table 10 in the delivery area 40, and controls the loading and unloading unit 41 to load a workpiece 100 that has been processed from the holding surface 11 of the chuck table 10 into the cassette 45. The control unit 50 includes a computer including an arithmetic processing apparatus having a microprocessor such as a central processing unit (CPU), a storage apparatus having a memory such as a read only memory (ROM) or a random access memory (RAM), and an input/output interface. The arithmetic processing apparatus of the control unit 50 performs arithmetic processing operations according to programs stored in the storage apparatus and outputs control signals for controlling the laser processing apparatus 1 via the input/output interface to the units of the laser processing apparatus 1.

As illustrated in FIG. 1, the control unit 50 includes an X-axis feed controller 51 and a processing and delivering controller 52. The X-axis feed controller 51 energizes the X-axis stepping motor 24 to rotate the ball screw 23 about its own axis to move the two X-axis moving tables 22 that support the respective two chuck tables 10 simultaneously in the X-axis direction along the X-axis guide rails 21 while they are being arrayed in the X-axis direction. The processing and delivering controller 52 controls the laser processing unit 30 to apply the laser beam 301 to a workpiece 100 held on one of the chuck tables 10 that is positioned below the laser processing unit 30, thereby processing the workpiece 100. At the same time, the processing and delivering controller 52 controls the loading and unloading unit 41 to load a workpiece 100 that has been processed by the laser beam 301 from the other chuck table 10 positioned in the corresponding delivery area 40 into the cassette 45 and to unload a workpiece 100 to be processed by the laser beam 301 from the cassette 45 and place the workpiece 100 on the holding surface 11 of the other chuck table 10.

Figure 3:
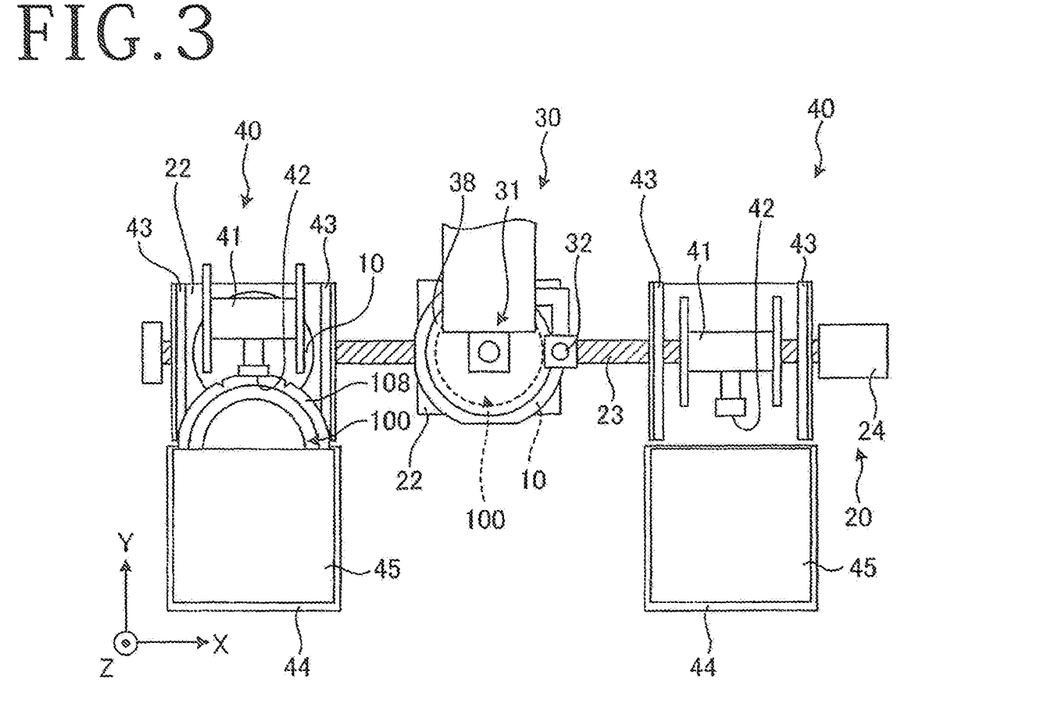
FIG. 3 is a plan view illustrating operation of the laser processing apparatus according to the first embodiment.
Figure 4:
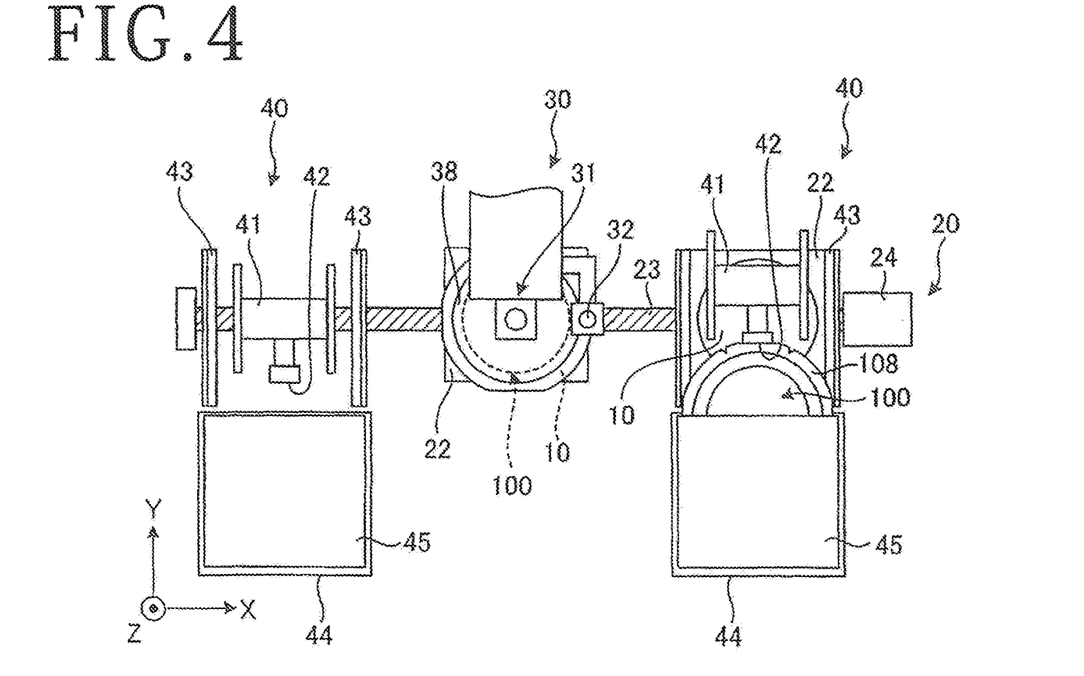
FIG. 4 is a plan view illustrating operation of the laser processing apparatus according to the first embodiment.

Operation of the laser processing apparatus 1 according to the first embodiment will be described hereinbelow with reference to FIGS. 3 and 4. FIGS. 3 and 4 are plan views illustrating operation of the laser processing apparatus 1 according to the first embodiment.

As illustrated in FIG. 3, in a case in which one of the chuck tables 10 is positioned below the laser processing unit 30 and the other chuck table 10 is positioned in the other delivery area 40, i.e., immediately after a second moving step to be described later, the processing and delivering controller 52 controls the laser processing unit 30 to apply the laser beam 301 to a workpiece 100 held on the one of the chuck tables 10, thereby processing the workpiece 100. At the same time, the processing and delivering controller 52 controls the loading and unloading unit 41 to load a workpiece 100 that has been processed from the other chuck table 10 into the cassette 45 and to unload a workpiece 100 to be processed from the cassette 45 and place the workpiece 100 onto the holding surface 11 of the other chuck table 10 (first processing and delivering step).

As illustrated in FIG. 3, in a case in which the first processing and delivering step is finished, i.e., immediately after the first processing and delivering step, with the one chuck table 10 being positioned below the laser processing unit 30 and the other chuck table 10 being positioned in the other delivery area 40, the X-axis feed controller 51 moves the two X-axis moving tables 22 that support the respective two chuck tables 10 simultaneously in the +X direction along the X-axis guide rails 21 while they are being arrayed in the X-axis direction and spaced from each other in the X-axis direction, until the one chuck table 10 is positioned in the one delivery area 40 and the other chuck table 10 is positioned below the laser processing unit 30 (first moving step), as illustrated in FIG. 4.

As illustrated in FIG. 4, immediately after the first moving step with the one chuck table 10 being positioned in the one delivery area 40 and the other chuck table 10 being positioned below the laser processing unit 30, the processing and delivering controller 52 controls the laser processing unit 30 to apply the laser beam 301 to a workpiece 100 held on the other chuck table 10, thereby processing the workpiece 100. At the same time, the processing and delivering controller 52 controls the loading and unloading unit 41 to load a workpiece 100 that has been processed from the one chuck table 10 into the cassette 45 and to unload a workpiece 100 to be processed from the cassette 45 and place the workpiece 100 onto the holding surface 11 of the one chuck table 10 (second processing and delivering step).

As illustrated in FIG. 4, in a case in which the second processing and delivering step is finished, i.e., immediately after the second processing and delivering step, with the one chuck table 10 being positioned in the one delivery area 40 and the other chuck table 10 being positioned below the laser processing unit 30, the X-axis feed controller 51 moves the two X-axis moving tables 22 that support the respective two chuck tables 10 simultaneously in the −X direction along the X-axis guide rails 21 while they are being arrayed in the X-axis direction and spaced from each other in the X-axis direction, until the one chuck table 10 is positioned below the laser processing unit 30 and the other chuck table 10 is positioned in the other delivery area 40 (second moving step), as illustrated in FIG. 3.

According to the first embodiment, in the first processing and delivering step and the second processing and delivering step, since the processing and delivering controller 52 controls the laser beam scanning unit 37 to scan the entire surface in the XY plane of the workpiece 100 held on the holding surface 11 of the chuck table 10 covered by the beam condenser 38, with the laser beam 301, the laser processing unit 30 can perform a desired laser processing process over the entire surface in the XY plane of the workpiece 100 without moving the chuck table 10 in the X-axis direction or the Y-axis direction.

In as much as the laser processing apparatus 1 according to the first embodiment can perform a desired laser processing process over the entire surface in the XY plane of the workpiece 100 with the laser processing unit 30 without moving the chuck table 10 in the X-axis direction or the Y-axis direction, movement of the chuck tables 10 is utilized to load and unload workpieces 100 below the laser processing unit 30. Furthermore, as the laser processing apparatus 1 according to the first embodiment has the pair of delivery areas 40 arrayed in the X-axis direction on both sides of the laser beam applying unit 31, workpieces 100 can be loaded and unloaded at one time below the laser processing unit 30 by controlling the X-axis feed unit 20 to simultaneously move the two chuck tables 10 as they are arrayed in the X-axis direction. Moreover, the laser processing apparatus 1 according to the first embodiment can load a processed workpiece 100 from the chuck table 10 in the delivery area 40 that has been retracted from below the laser processing unit 30 into the cassette 45 and to unload a workpiece 100 to be processed from the cassette 45 onto the chuck table 10, while at the same time performing a laser processing process on the chuck table 10 positioned below the laser processing unit 30. Therefore, the laser processing apparatus 1 according to the first embodiment is able to carry out an efficient laser processing process using the feature of the laser beam applying unit 31 that the laser beam 301 is applied in a wide area.

In addition, the laser processing apparatus 1 according to the first embodiment has the laser beam scanning unit 37 that includes a galvanometer scanner, a resonant scanner, an acousto-optic deflector, or a polygon mirror. Therefore, the laser processing apparatus 1 according to the first embodiment can perform a desired laser processing process over the entire surface in the XY plane of the workpiece 100 by scanning the entire surface of the workpiece 100 with the laser beam 301.

Moreover, the laser processing apparatus 1 according to the first embodiment has the delivery areas 40 including the respective loading and unloading units 41 for loading a workpiece 100 from the chuck table 10 into the cassette 45 and unloading a workpiece 100 from the cassette 45 onto the chuck table 10. Consequently, the laser processing apparatus 1 according to the first embodiment has the loading and unloading units 41 each for automatically loading a processed workpiece 100 from the chuck table 10 in the delivery area 40 into the cassette 45 and unloading a workpiece 100 to be processed from the cassette 45 onto the chuck table 10 in the delivery area 40. Accordingly, the laser processing apparatus 1 according to the first embodiment can perform an efficient laser processing process on workpieces 100.

Second Embodiment

Figure 5:
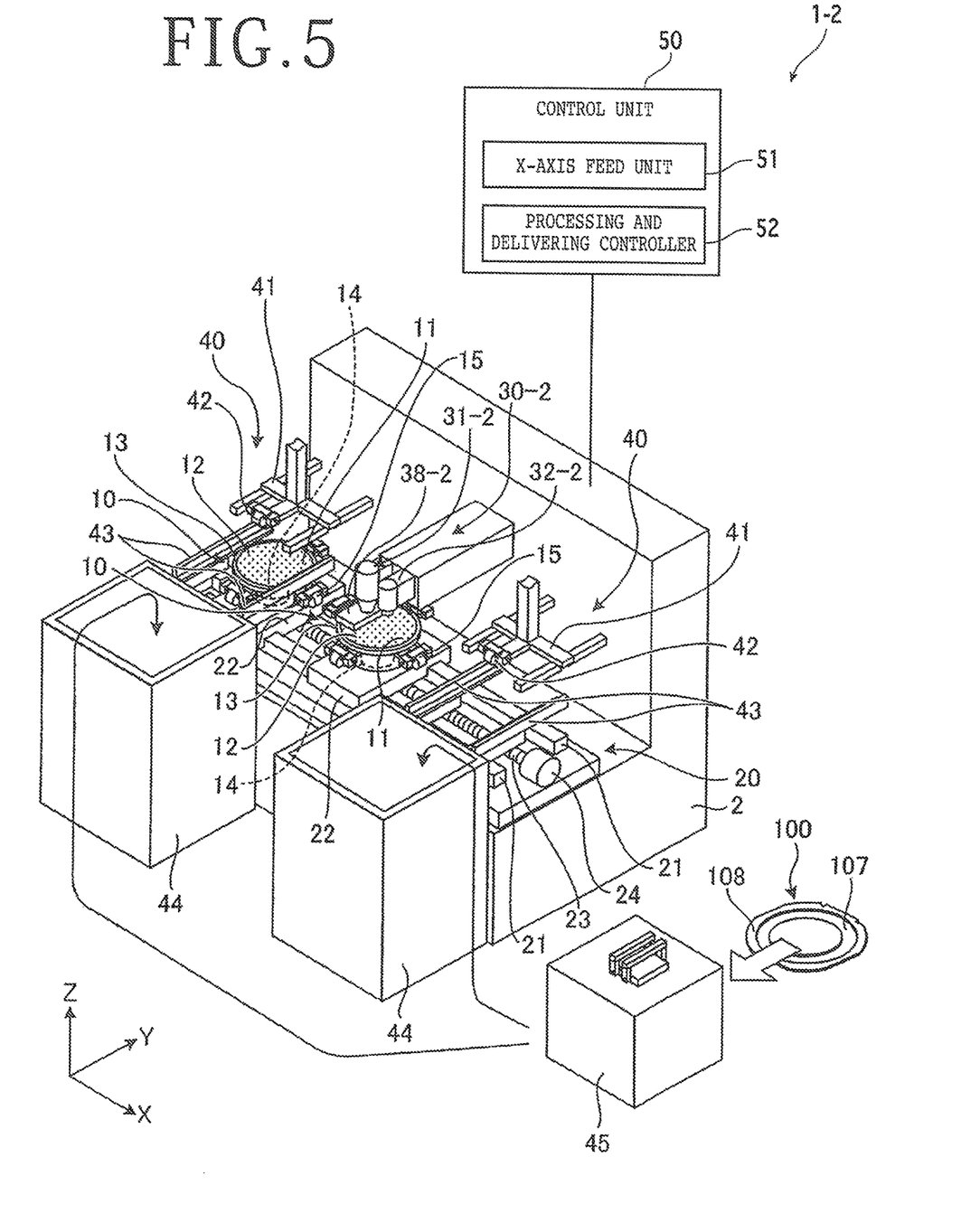
FIG. 5 is a perspective view illustrating an example of a configuration of a laser processing apparatus according to a second embodiment of the present invention.
Figure 6A:
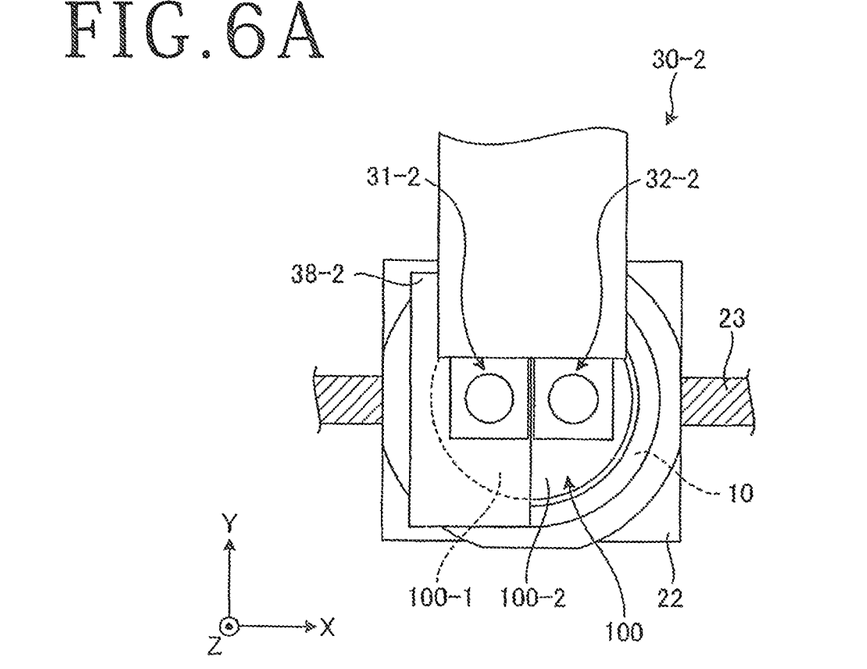
FIGS. 6A and 6B are plan views illustrating operation of the laser processing apparatus according to the second embodiment.
Figure 6B:
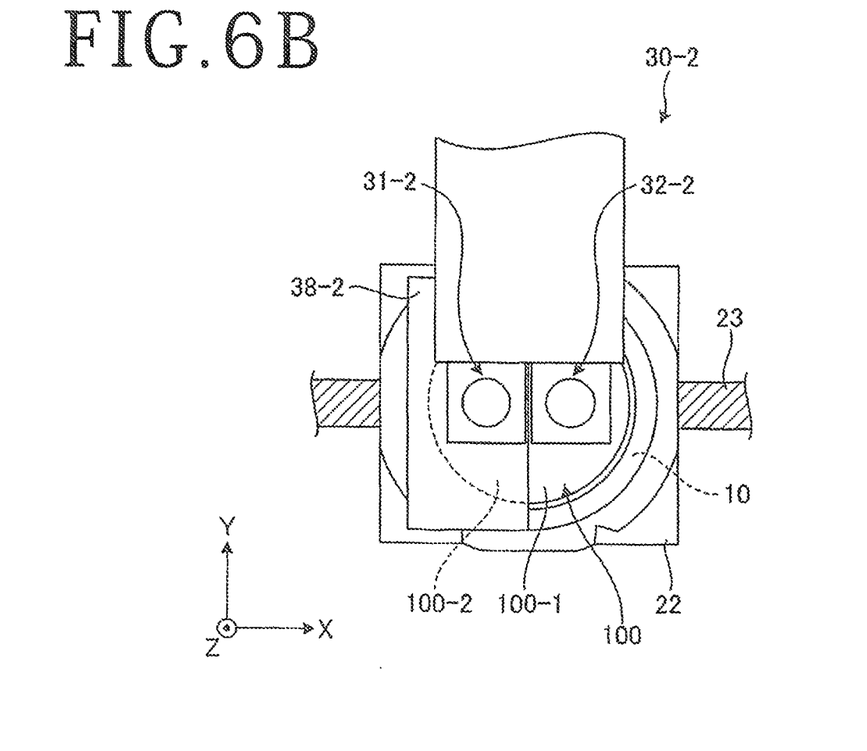

A laser processing apparatus 1-2 according to a second embodiment of the present invention will be described below with reference to FIGS. 5, 6A, and 6B. FIG. 5 is a perspective view illustrating an example of a configuration of the laser processing apparatus 1-2 according to the second embodiment. FIGS. 6A and 6B are plan views illustrating operation of the laser processing apparatus 1-2 according to the second embodiment. Those parts of the laser processing apparatus 1-2 which are identical to those of the laser processing apparatus 1 according to the first embodiment are denoted by identical reference symbols, and their description will be omitted.

As illustrated in FIGS. 5, 6A, and 6B, the laser processing apparatus 1-2 according to the second embodiment is of the same structure as the laser processing apparatus 1 according to the first embodiment except that it includes, in addition to the components according to the first embodiment described above, a rotary unit 14 combined with each of the chuck tables 10 and a laser processing unit 30-2 instead of the laser processing unit 30. According to the second embodiment, the holding surface 11 of each of the chuck tables 10 is rotatable around its own axis along the Z-axis direction by the rotary unit 14.

As illustrated in FIGS. 5, 6A, and 6B, the laser processing unit 30-2 includes a laser beam applying unit 31-2 and an image capturing unit 32-2 spaced from the laser beam applying unit 31 in the X-axis direction and oriented in the −Z direction.

The laser beam applying unit 31-2 is essentially identical to the laser beam applying unit 31 according to the first embodiment except that it includes a beam condenser 38-2 instead of the beam condenser 38. The beam condenser 38-2 is different in shape and size from the beam condenser 38 and is of a rectangular shape in the XY plane. The beam condenser 38-2 is disposed in covering relation to an area that is about one-half of the holding surface 11 of the chuck table 10 as it is positioned below the laser beam applying unit 31-2.

As illustrated in FIGS. 5, 6A, and 6B, the image capturing unit 32-2 has an optical axis involved in image capturing, passing through an area of the holding surface 11 of the chuck table 10 positioned below the laser beam applying unit 31, the area being about the remaining one half thereof not covered by the beam condenser 38-2. Therefore, the image capturing unit 32-2 can capture an image of about the remaining one half of the holding surface 11, not covered by the beam condenser 38-2, of the chuck table 10 positioned below the laser beam applying unit 31. The image capturing unit 32-2 captures an image of the workpiece 100 held on the holding surface 11 of the chuck table 10 that is positioned below the laser beam applying unit 31, as an image to be used for an alignment process for positioning the workpiece 100 held on the holding surface 11 of the chuck table 10 and the position where the laser beam 301 is applied by the laser beam applying unit 31 with respect to each other, and outputs the acquired image to the control unit 50.

Operation of the laser processing apparatus 1-2 according to the second embodiment will be described hereinbelow. According to the second embodiment, the processing and delivering controller 52 controls the laser beam scanning unit 37 to scan one half in the −X direction of the entire surface in the XY plane of the workpiece 100 held on the holding surface 11 of the chuck table 10 covered by the beam condenser 38-2, with the laser beam 301. Therefore, as illustrated in FIG. 6A, the processing and delivering controller 52 places one half 100-1 of the workpiece 100 in the area covered by the beam condenser 28-2, and performs a desired laser processing process over the entire one half 100-1 of the workpiece 100. Then, the processing and delivering controller 52 controls the rotary unit 14 to turn the chuck table 10 through 180 degrees, i.e., half circumferentially, about the Z-axis, placing other half 100-2 of the workpiece 100 in the area covered by the beam condenser 28-2, as illustrated in FIG. 6B. Thereafter, the processing and delivering controller 52 performs a desired laser processing process over the entire other half 100-2 of the workpiece 100. According to the second embodiment, in this manner, the processing and delivering controller 52 performs a laser processing process on each of the halves 100-1 and 100-2 of the workpiece 100 using the rotary unit 14 and the laser beam scanning unit 37.

Since the laser processing apparatus 1-2 according to the second embodiment can control the laser processing unit 30 to perform a desired laser processing process over the entire surface in the XY plane of the workpiece 100 without moving the chuck table 10 in the X-axis direction or the Y-axis direction by turning the chuck table 10 through 180 degrees once with the rotary unit 14, movement of the chuck tables 10 is utilized to load and unload workpieces 100 below the laser processing unit 30. Other structural operational details of the laser processing apparatus 1-2 according to the second embodiment are the same as those of the laser processing apparatus 1 according to the first embodiment. Consequently, the laser processing apparatus 1-2 according to the second embodiment is able to carry out an efficient laser processing process using the feature of the laser beam applying unit 31 that the laser beam 301 is applied in a wide area.

Moreover, inasmuch as the image capturing unit 32-2 of the laser processing apparatus 1-2 according to the second embodiment can capture an image of a portion of the holding surface 11 of the chuck table 10 positioned below the laser beam applying unit 31, without being obstructed by the beam condenser 38-2, the laser processing apparatus 1-2 according to the second embodiment has a higher degree of accuracy of the alignment process than the laser processing apparatus 1 according to the first embodiment. The present invention is not limited to the embodiments described above, but various changes and modifications may be made therein without departing from the scope of the invention.

The X-axis feed unit 20 according to the present invention is not limited to the structure including the X-axis stepping motor 24 and the X-axis ball screw 23. Rather, an X-axis feed unit according to the present invention may control a linear-motion mechanism including linear servomotors as drive sources incorporated in respective two chuck tables, which may be referred to as first and second chuck tables, the linear servomotors being in independently controllable for X-axis feeding operation. According to such a modification, while one of the chuck tables is at rest, the other chuck table can be controlled to move, so that less limitations are imposed on delivering and processing workpieces.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:
    a first chuck table for holding a workpiece on a holding surface thereof;
    a second chuck table for holding a workpiece on a holding surface thereof;
    an X-axis feed unit for moving the first chuck table and the second chuck table which are being arrayed in an X-axis direction;
    a laser beam applying unit for applying a laser beam to the workpiece on one at a time of the first chuck table and the second chuck table to process the workpiece; and
    a pair of delivery areas arrayed in the X-axis direction on opposing sides of the laser beam applying unit, for delivering workpieces to and from the first chuck table and the second chuck table, wherein said X-axis feed unit moves the first chuck table and the second chuck table to and from the laser beam applying unit from a respective one of said delivery areas;
    wherein the laser beam applying unit includes:
        a laser oscillator for emitting the laser beam,
        a beam condenser for condensing the laser beam emitted from the laser oscillator, and
        a laser beam scanning unit disposed between the laser oscillator and the beam condenser, for displacing a position where the laser beam is applied to the holding surface of the one of the first chuck table and the second chuck table.

2. The laser processing apparatus according to claim 1, wherein the laser beam scanning unit includes either one of a galvanometer scanner, a resonant scanner, an acousto-optic deflector, and a polygon mirror.

3. The laser processing apparatus according to claim 1, wherein the first chuck table and the second chuck table each include a rotary unit for rotating the holding surface thereof about an axis perpendicular to the holding surface.

4. The laser processing apparatus according to claim 1, further comprising:
    a pair of loading and unloading units disposed in the delivery areas, for delivering workpieces to and from the first chuck table and the second chuck table.

5. The laser processing apparatus according to claim 4, wherein the each of said pair of loading and unloading units includes a gripper for gripping a frame that supports the workpiece.

6. The laser processing apparatus according to claim 1, wherein the each of said pair of delivery areas includes guide rails oriented along a Y-axis, wherein said guide rails move toward and away from each other, said guide rails each being configured to support the workpiece.

7. The laser processing apparatus according to claim 1, wherein the each of said pair of delivery areas includes a cassette elevator and a cassette, said cassette configured to store a plurality of workpieces.

8. The laser processing apparatus according to claim 1, wherein said X-axis feed unit moves the first chuck table and the second chuck table independently in the X-direction.

9. The laser processing apparatus according to claim 1, wherein said X-axis feed unit moves the first chuck table and the second chuck table simultaneously in the X-direction.

* * * * *